No. 732,767. PATENTED JULY 7, 1903.
M. A. METZNER.
MACHINE FOR REMOVING GLAZE FROM THE EDGES OF TILE.
APPLICATION FILED APR. 26, 1902.
NO MODEL. 6 SHEETS—SHEET 1.
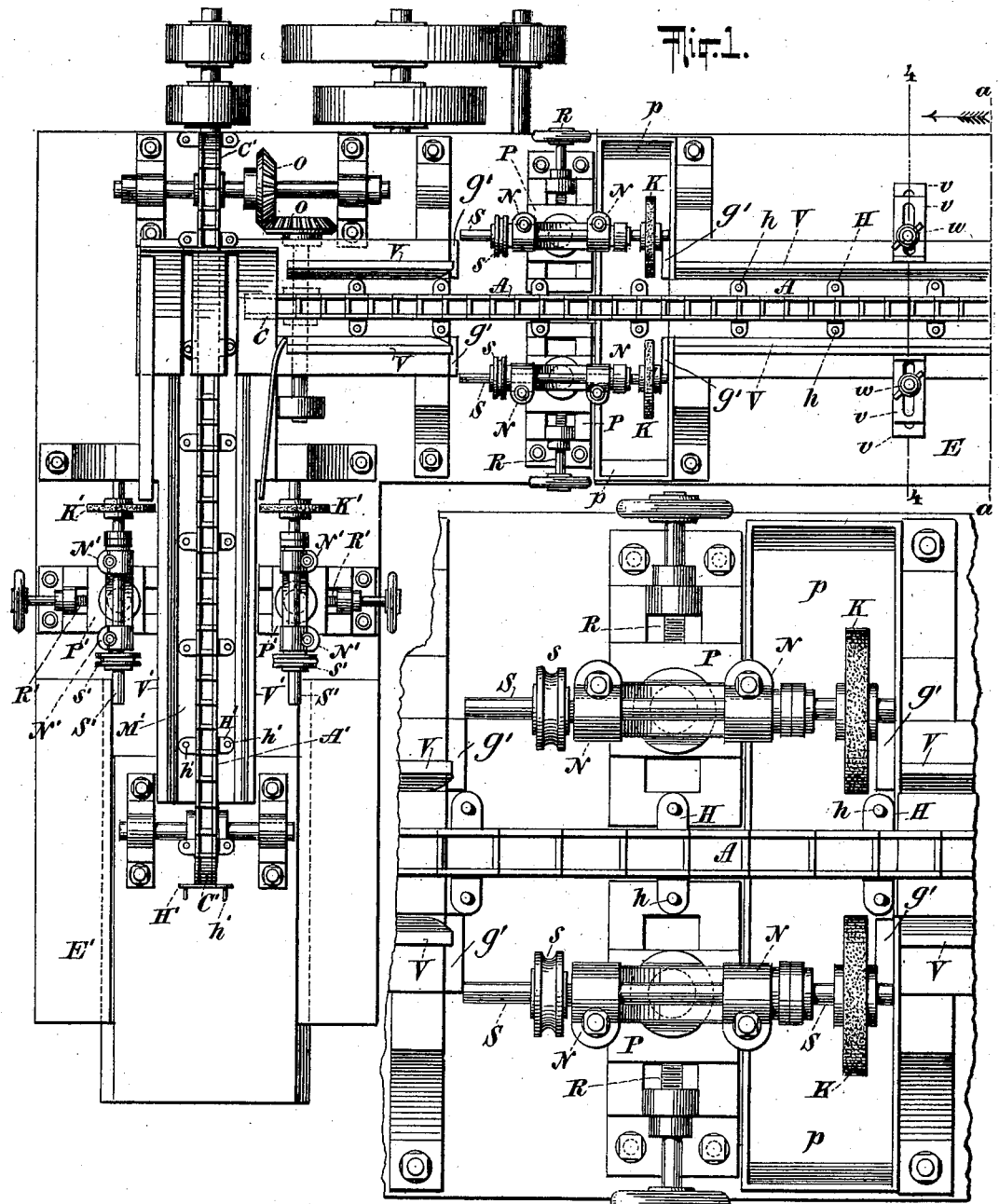
WITNESSES: INVENTOR
Max A. Metzner
BY
Bird & Tarbox
ATTORNEYS No. 732,767. PATENTED JULY 7, 1903.
M. A. METZNER.
MACHINE FOR REMOVING GLAZE FROM THE EDGES OF TILE.
APPLICATION FILED APR. 26, 1902.
NO MODEL. 6 SHEETS—SHEET 2.
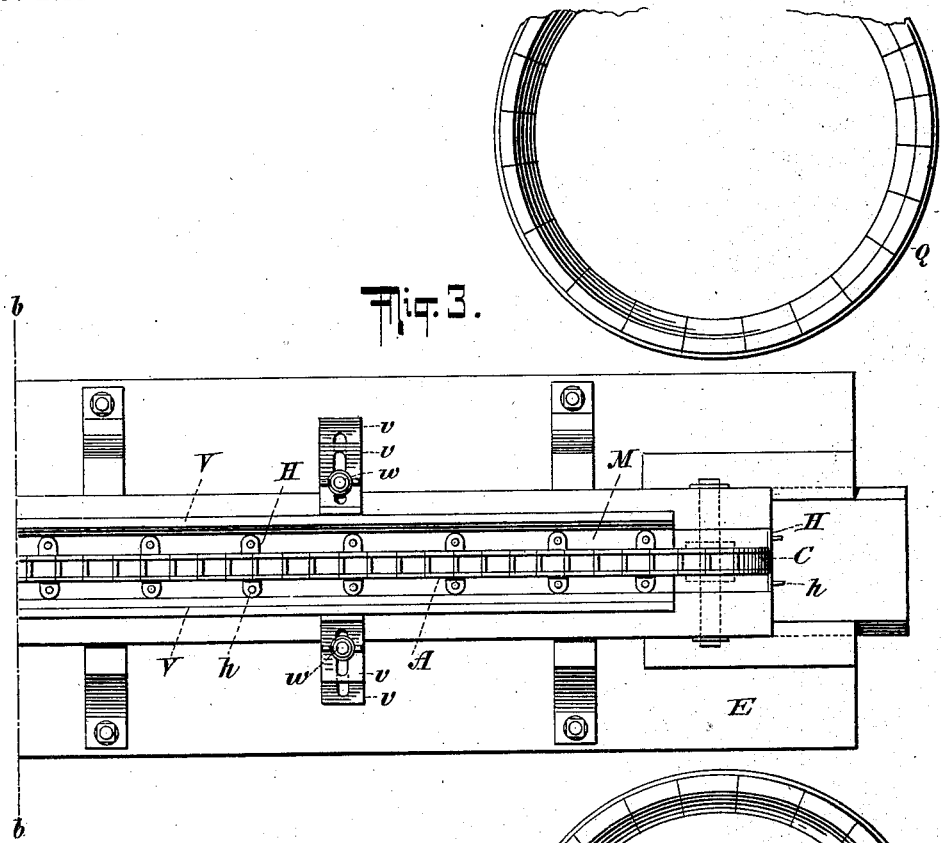
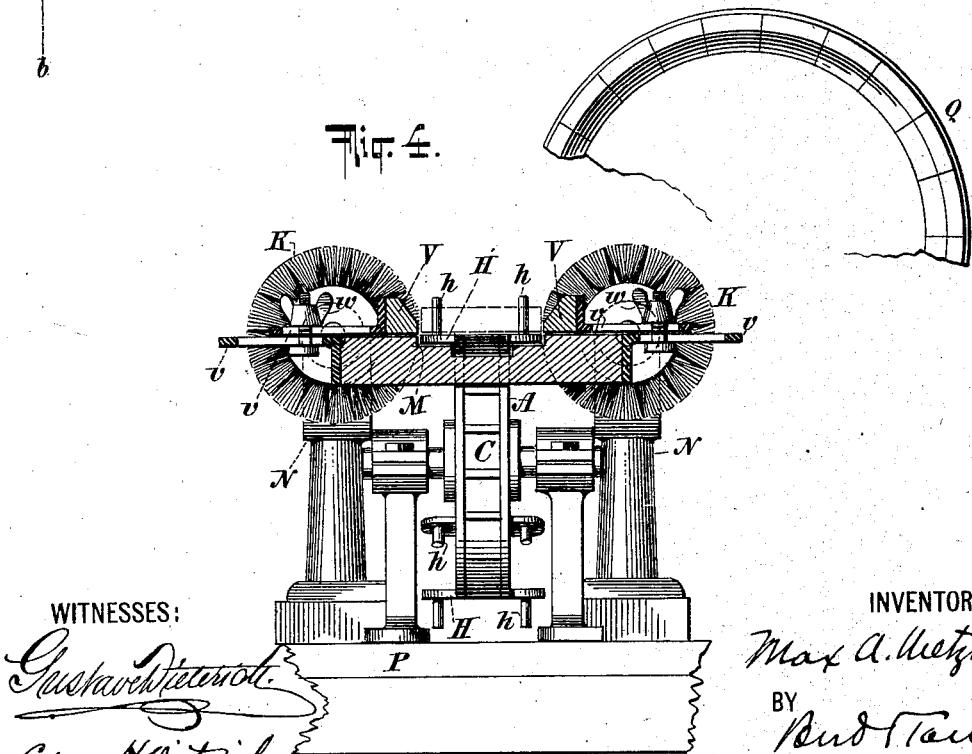

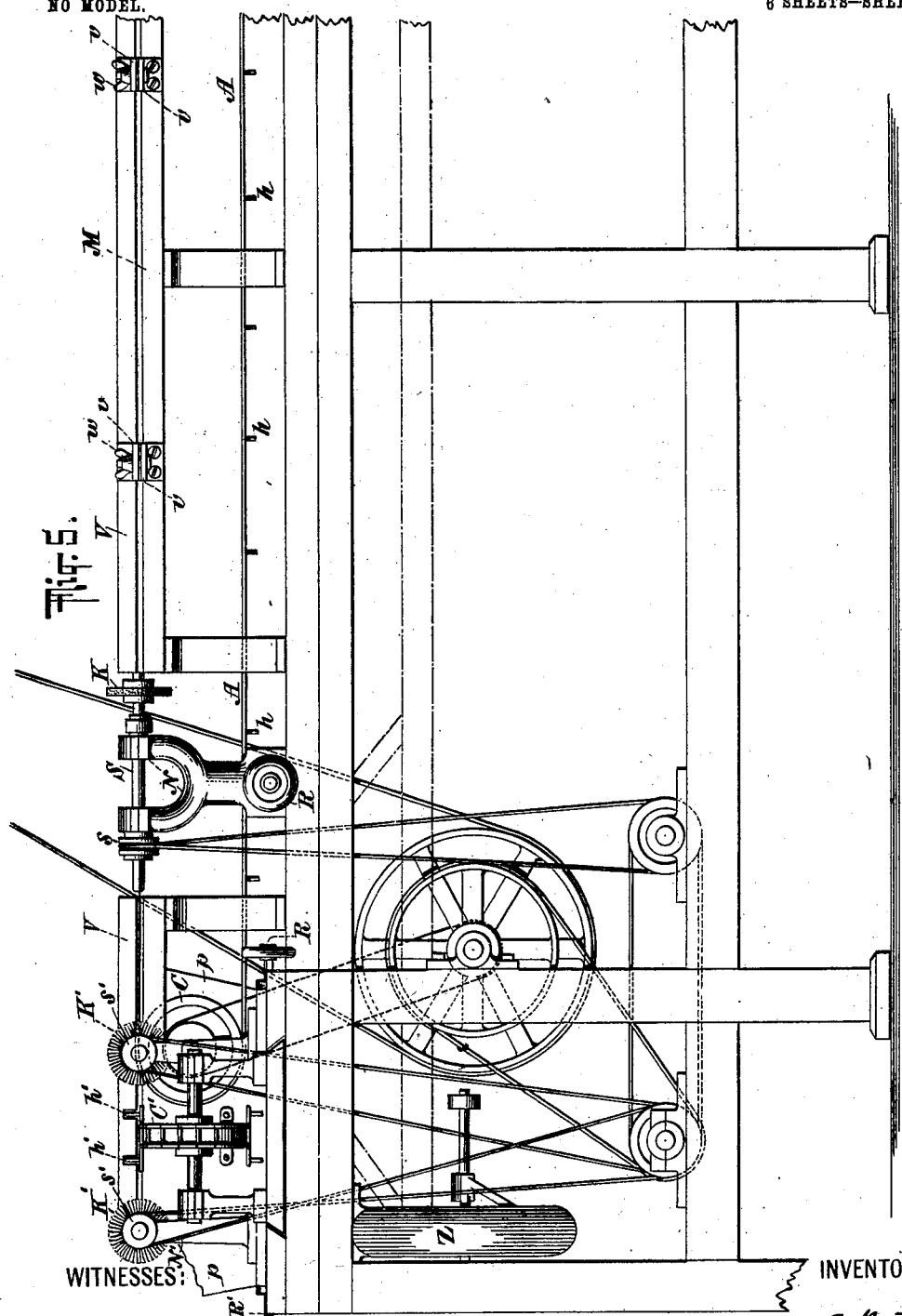

No. 732,767. PATENTED JULY 7, 1903.
M. A. METZNER.
MACHINE FOR REMOVING GLAZE FROM THE EDGES OF TILE.
APPLICATION FILED APR. 26, 1902.
NO MODEL. 6 SHEETS—SHEET 4.

WITNESSES:
INVENTOR
Max A. Metzner
BY
ATTORNEYS.

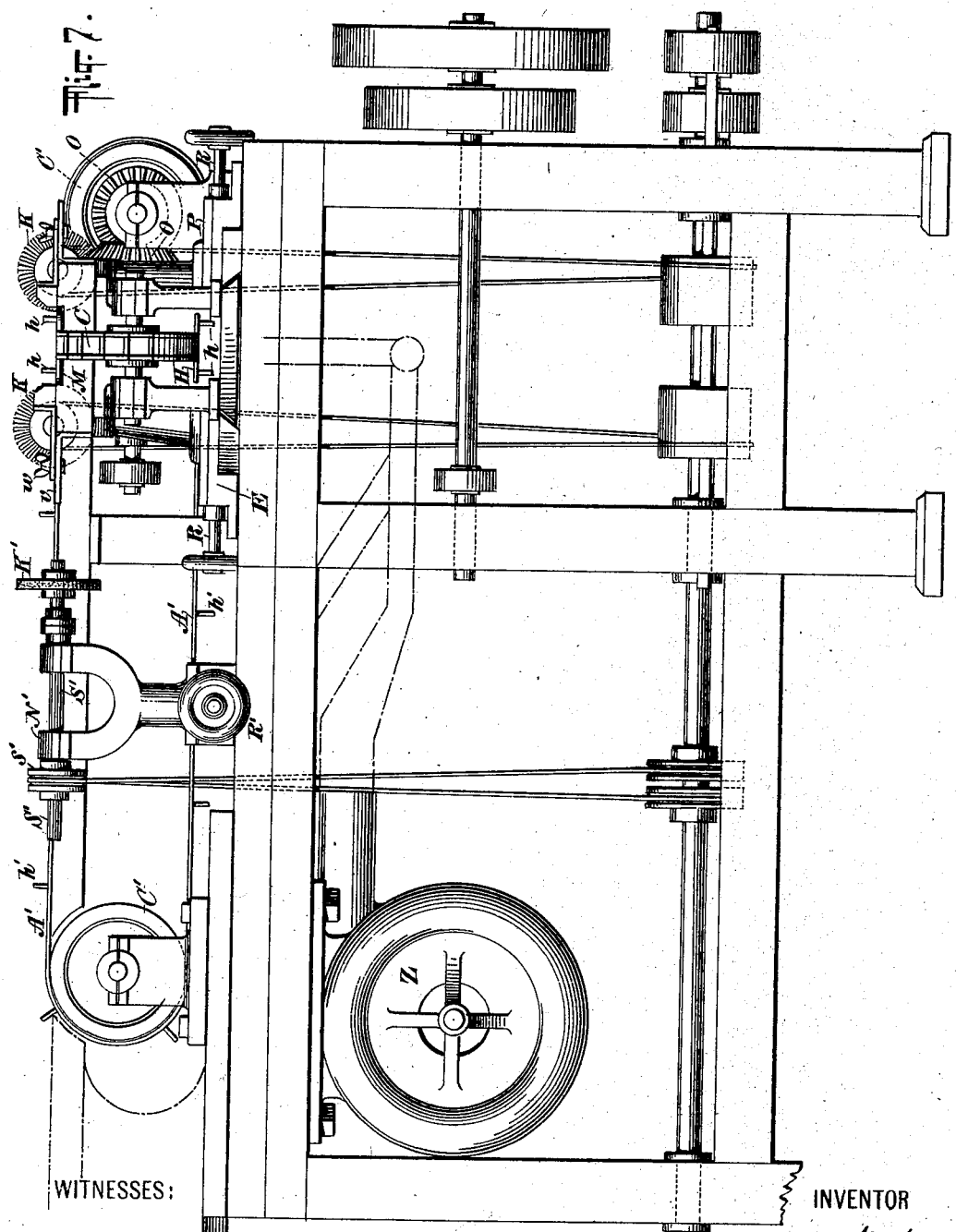

No. 732,767. PATENTED JULY 7, 1903.
M. A. METZNER.
MACHINE FOR REMOVING GLAZE FROM THE EDGES OF TILE.
APPLICATION FILED APR. 26, 1902.
NO MODEL. 6 SHEETS—SHEET 6.

WITNESSES:
INVENTOR
BY
ATTORNEY

No. 732,767. Patented July 7, 1903.

UNITED STATES PATENT OFFICE.

MAX A. METZNER, OF METUCHEN, NEW JERSEY, ASSIGNOR TO THE C. PARDEE WORKS, OF PERTH AMBOY, NEW JERSEY, A CORPORATION OF NEW JERSEY.

MACHINE FOR REMOVING GLAZE FROM THE EDGES OF TILE.

SPECIFICATION forming part of Letters Patent No. 732,767, dated July 7, 1903.

Application filed April 26, 1902. Serial No. 104,809. (No model.)

*To all whom it may concern:*

Be it known that I, MAX A. METZNER, a citizen of the United States, residing at Metuchen, in the county of Middlesex and State of New Jersey, have invented a new and useful Machine for Removing from the Edges of Biscuit-Tile the Surplus Glaze Mixture that Adheres to the Edges in Process of Dipping, of which the following is a specification.

Hitherto the glaze mixture which attaches to the edges of tile when dipped has been removed by some hand process of scraping with a knife or other instrument. This method is tedious and leaves the edges irregularly cleaned. The glaze of many tile are defaced in the handling, much, if not all, of the scrapings are lost, the dipper is retarded by being obliged to carefully arrange the tile in piles as he dips, and small particles of the iron or steel frequently become embedded in the glaze on the top surface of the tile, causing discoloration when burned. I overcome all these objections by my invention, which is capable with three or four hands of accomplishing as much as thirty-three or thirty-four hands could by the old method. Furthermore, the edges are cleaned uniformly, and in this connection it is important to call attention to the fact that by means of my invention just a sufficient amount of glaze in each case is left along the top of the edge to permit of the top glaze taking more firmly and uniformly around the edges. I also effect a great economy in that by my invention all the matter removed from the tile is saved and used over again.

I attain the above objects by the mechanism illustrated in the accompanying drawings, in which—

Figure 9:
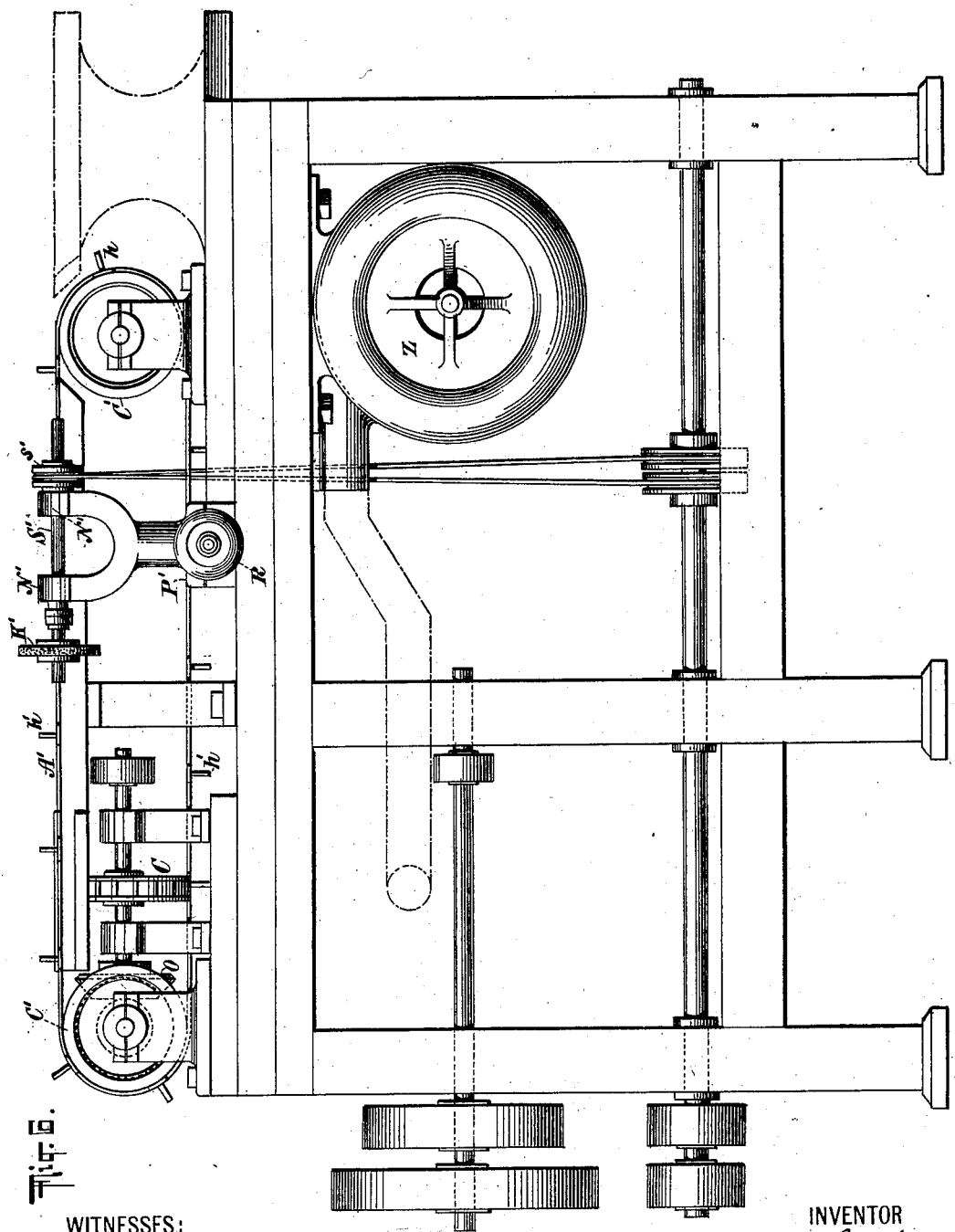
Figure 9:
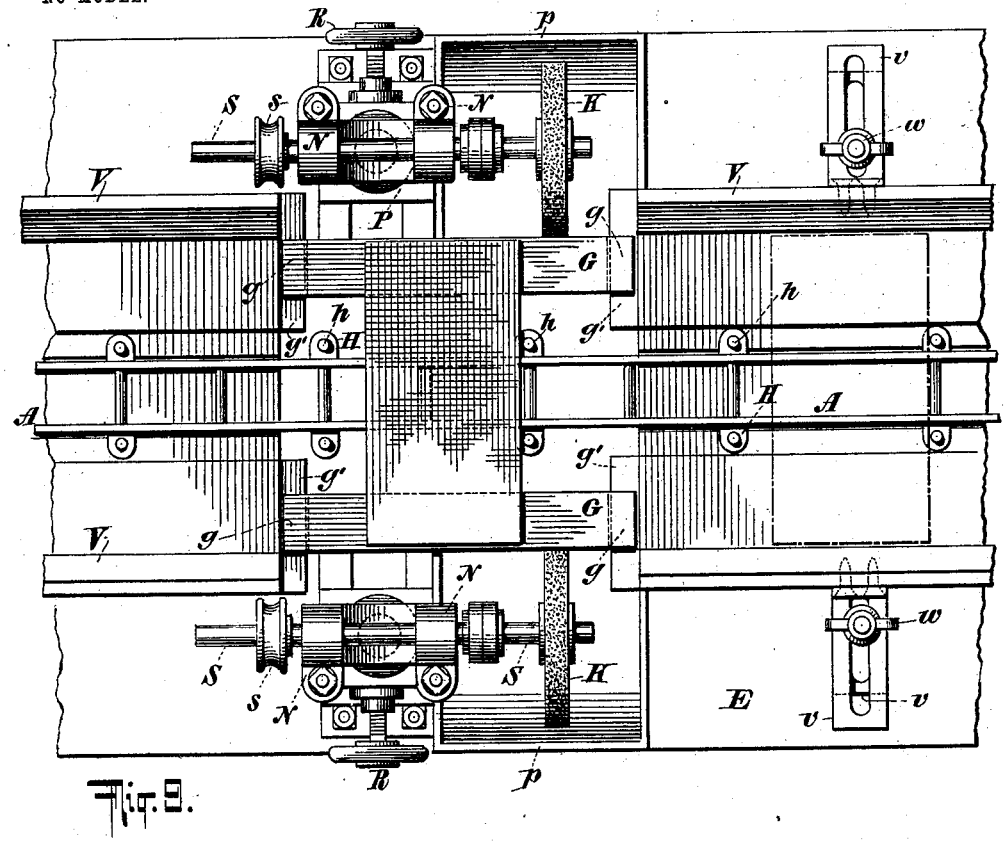
Figure 8:
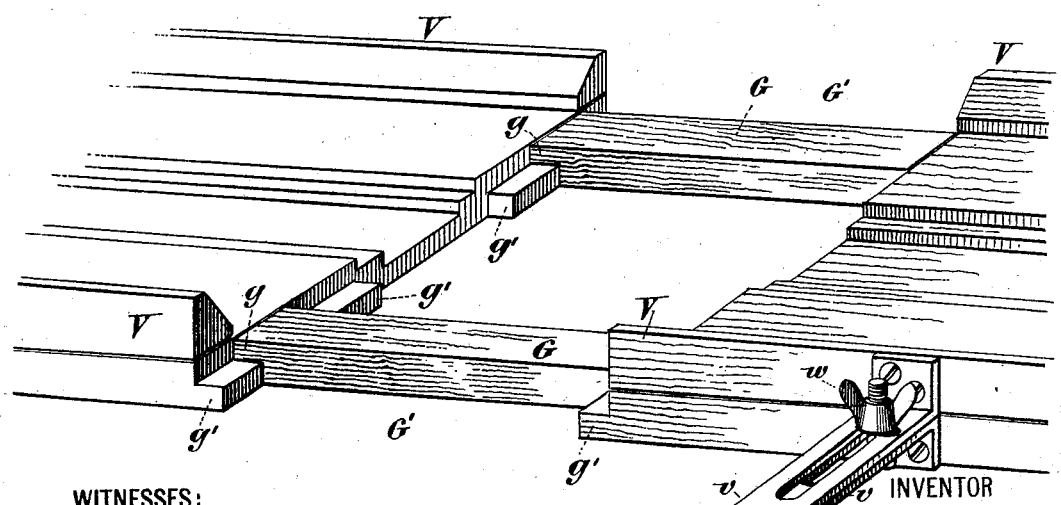

Figure 1 is a plan view; Fig. 2, an enlarged detail plan of brushing mechanism; Fig. 3, a portion of plan view. When lines *a b* are brought together with Fig. 1 they constitute a complete plan view of my apparatus. Fig. 4 is a cross-section on the line 4 4 of Fig. 1 looking in direction of arrow. Fig. 5 is a side view of my machine. Fig. 6 is a rear view of my machine. Fig. 7 is a front view of my machine. Fig. 8 is a detail plan view of portion of tables between brushes. Fig. 9 is an enlarged detail plan view showing construction of table and mode of operation at brushing-point.

Similar letters refer to similar parts throughout the several views.

My device and suitable mechanism for operating the same are supported upon suitable framework.

My invention consists of two similar portions or parts arranged at right angles to each other. For convenience I will first describe one part and then describe the relations of the two parts.

E is a long table in whose center and longitudinally thereof extends a T-shaped groove M, in which travels an endless chain or belt A, (hereinafter called the "carrier,") supported at each end upon wheels or pulleys C C, one of which serves also as a driving-wheel for said carrier. The carrier A is arranged and supported in said groove in such relation to the surface of the table E that its top does not project above the level of said surface. I show and prefer to use a chain for a carrier, as the same is less liable to stretch. This chain may be of any ordinary type used in connection with sprocket-wheels with the modification of certain links at regular intervals having arms H H, with pins or lugs *h h*. These arms H H rest loosely upon the shoulders of the T-shaped groove, and the pins project above the surface of the table E, so as to engage the rear edge of the tile when placed on the table and impel it forward along the same and between two oppositely-disposed revolving circular brushes K K, so situated that their peripheries will bear against and clean the two opposite edges of the tile as it is passed between them. This table also acts as a support for the tile during the operation. The brushes K K are revolved inwardly upon shafts S S at right angles to the line of motion of the carrier A. The shafts S S are arranged in separate bearings N N and supplied with driving-pulleys *s s*. The power is transmitted so that the brushes may be run at speeds independent of the other parts of the device. These bearings and shafts are mounted upon slides P P, so that by means of adjusting-screws R R they can be made to approach or recede from each other to suit the width of the tile and also so that they do not bear against the entire edge of the tile, but leave a line of glaze along the upper portion of the edge, assuring a stronger edge. At this point the table is constructed, as shown in Fig. 8 at G' G', of parts G G, having arms g g, designed to support the ends of the tile while passing this point and adapted to slide on shoulders g' g', so that when tile smaller than the width of the table are being cleaned these parts G G may be moved in toward the carrier to positions where they will support the ends of such smaller tile.

The tile is guided in its movement along the table E by small guide-rails V V, adjustable laterally on said table by means of slotted brackets v v and adjusting-screw w and are set far enough apart to suit the width of the tile. These guide-rails converge slightly as they approach the brushes and are slightly flexible at the ends nearest the brushes. The guides stop at the brushes, but are continued beyond the same to the table E'.

The lugs or pins h h on the carrier A are arranged at intervals, according to the length of the tile edge to be dressed, as closely as will allow of one tile to be cleared out of the way of its successor by the second carrier A'.

Table E', having T-shaped groove M' and guide-rails V' V', carrier A', having arms H' H', with lugs h' h', wheels or pulleys C' C', and brushes K' K' are like parts in like relation to each other in the second portion of my invention, supported on suitable framework, all at right angles to the first portion.

The carrier A' is driven by means of a beveled gear, as shown at O, connected with the shaft or journal of the driving-wheel C, so that its speed is synchronous with that of carrier A. The two parts or portions are so arranged with reference to each other that as carrier A turns down over wheel C the tile is deposited on table E', so that the pins or lugs h' h' of carrier A' catch the rear edge of the tile as it is received from carrier A and impel it forward along the table E' and between brushes K' K', which clean the opposite and remaining uncleaned edges. The tile is then deposited upon the platform or end of table E', the carrier A' turning down and around wheels C' C' and back in endless operation, as does carrier A.

The receptacles p p and p' p' receive and retain the glaze which is removed from the tile, which is preserved for remixing and future use. Hoods to which are connected pipes leading without the building may be affixed to these receptacles for the purpose of drawing off by means of a blower Z any dust arising from the operation. This I do not claim as part of my invention, however.

Valuable features of the circular brushes which I use are that they clean themselves by means of their own revolutions and that the wear of the bristles is uniform, thus permitting the use of the brush until the bristles are entirely worn away. These brushes K K and K' K' may be driven by any suitable mechanism. In the drawings I show them driven by pulleys mounted on counter-shafts. While other forms of brushes or other wiping devices, both movable and stationary, may be used, for the reasons given I prefer the circular brushes.

The following is a brief description of the method employed in operating my invention.

The tile are dipped by hand in the liquid glaze contained in suitable receptacles Q Q adjacent to the table E and as fast as dipped are dropped on the table. They are then caught by the lugs of the carrier A and carried between the brushes K K, which are so set as to remove the glaze from the greater portion of two opposite edges, but leaving a line of glaze along the top of such edges. The tile are then carried on a short distance and deposited automatically upon table E' and are caught one after the other by the lugs on carrier A' and carried between the brushes K' K', which operate upon the two uncleaned opposite edges in the same manner as brushes K K did upon the first pair of edges. The tile is then pushed onto the end of the table by the carrier A' at the point where it turns down over the wheel C'. The tile are removed from the end of the table by hand.

What I claim, and desire to secure by Letters Patent, is—

1. A machine for edging tile comprising one or more pairs of brushes, the members of each pair adapted to act simultaneously across opposite edges of a passing tile, means for adjusting said brushes, and means adapted to present the edges of different-sized tile to the action of said brushes.

2. A machine for edging tile comprising brushes revoluble on horizontal axes and horizontal movable tile-carriers running therebetween adapted to allow the brushes to wipe across the opposite edges only of the passing tile, and means for independently actuating said brushes and carriers.

3. A machine for edging tile, comprising circular brushes revoluble on horizontal axes, a table directly supporting the tile while in transit and a carrier traveling through said table and adapted to bring opposite edges of the tile simultaneously in contact with said brushes acting across the faces of said edges.

4. In a tile-edging machine, the combination with brushes operating across the edges of the passing tile, of a table directly supporting the tile in transit and means for moving tile along said table and between one or more pairs of said brushes so that only opposite edges are wiped thereby.

5. A tile-edging machine comprising a table for directly supporting the tile in transit, brushes adapted to wipe across the edges of the tile, and means for moving the tile along said table so as to present their edges to the action of said brushes.

6. A tile-edging machine comprising a table for supporting the tile in transit, independently-actuated brushes adapted to wipe across the opposite edges of the tile, means for adjusting said brushes, and means for moving the tile along said table so as to present their edges to the action of said brushes.

7. In a tile-edging machine the combination of brushes independently revoluble in a plane normal to the edge of the tile, and a carrier-table extending therebetween, with a second set of similar brushes similarly disposed, a second similar carrier-table all positioned substantially at right angles to the first set, and means for conveying tile along said tables so that the four edges thereof will have been subjected to the action of said brushes.

8. A tile-edging machine comprising a table for directly supporting the tile, circular brushes revoluble in a plane normal to the adjacent edge of the passing tile for wiping across the edges of the tile, means for independently revolving said brushes, and an endless carrier having lugs for engaging the tile and moving them along said table so that opposite edges are wiped by said brushes.

9. In a tile-edging machine, a carrier-table having movable parts supporting the tile and adapted to be adjusted for different-sized tile, in combination with wiping members and means for adjusting the same.

10. In a tile-edging machine, a carrier-table having a longitudinal groove therein, longitudinal guide-rails thereon and means for adjusting the same, movable parts supporting the tile and adapted to be adjusted for different-sized tile.

11. In a tile-edging machine, a carrier-table having a longitudinal T-shaped groove therein and longitudinal converging guide-rails thereon flexible in part, in combination with a carrier adapted to travel in said groove.

12. In a tile-edging machine the combination of a carrier-table having a longitudinal T-shaped groove therein and adjustable guide-rails thereon, with an endless carrier adapted to travel in said T-shaped groove, and having arms with lugs projecting above the surface of the table.

13. In a tile-edging machine, the combination with a pair of oppositely-disposed revoluble brushes of a carrier-table extending between said brushes and an endless carrier adapted to carry tile resting directly on said table along the same so that opposite edges shall be wiped by the downward action of said brushes.

14. A tile-edging machine comprising brushes and means for adjusting the same, a table having movable parts, adapted to be adjusted for different-sized tile, longitudinal guide-rails, means for adjusting the same, and a T-shaped groove in said table, an endless carrier adapted to travel in said groove, in combination with similar parts similarly disposed and positioned at right angles thereto, and means for imparting motion to the carriers and brushes, said first carrier being adapted to automatically deliver the tile to the second carrier.

15. In a tile-edging machine the combination of revoluble brushes, means for independently revolving the same, means for adjusting the same, carrier-tables directly supporting the tile, carriers having lugs for engaging the tile and connecting mechanism therefor.

16. In a tile-edging machine, a carrier-table having movable parts supporting the tile and adapted to be adjusted for different-sized tile.

MAX A. METZNER.

Witnesses:
SAMUEL B. MORGAN,
J. WARREN BIRD.